July 3, 1951  H. S. JACOBS  2,559,538
MOTOR SPEED CONTROL
Filed April 16, 1945  2 Sheets-Sheet 1

INVENTOR.
Henry S. Jacobs
BY
David G. Fox
ATTORNEY.

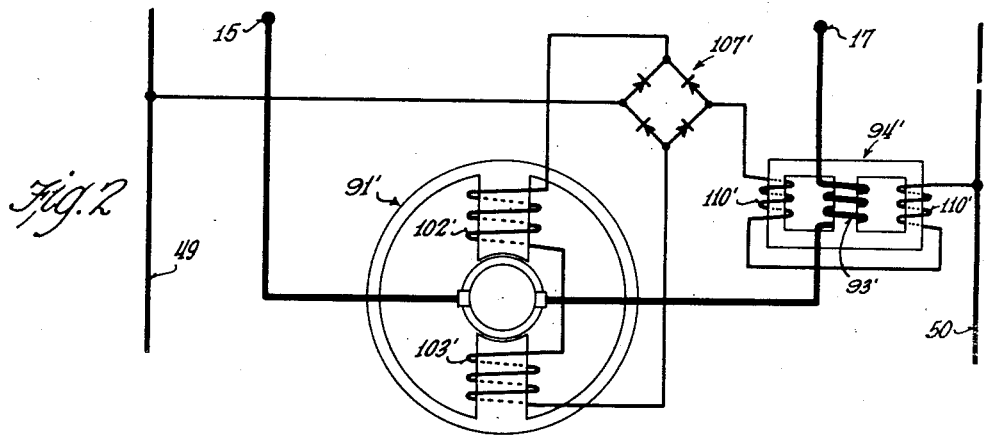
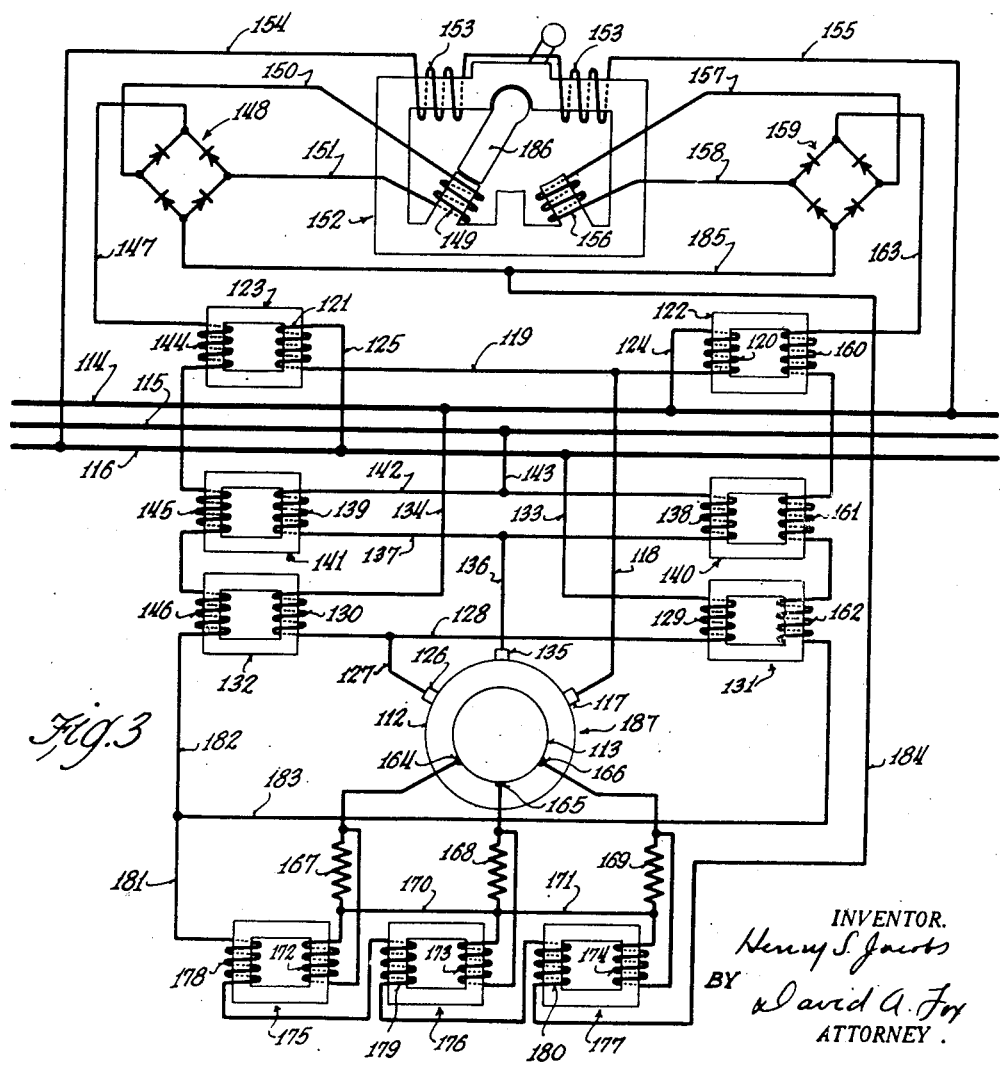

Patented July 3, 1951

2,559,538

UNITED STATES PATENT OFFICE 2,559,538

MOTOR SPEED CONTROL

Henry S. Jacobs, Milwaukee, Wis., assignor to Harnischfeger Corporation, Milwaukee, Wis., a corporation of Wisconsin Application April 16, 1945, Serial No. 588,685

5 Claims. (Cl. 318—141)

This invention relates to electric motor control of the type wherein the motor remains permanently connected to a generator whose output is varied by regulation of the excitation of the generator field, and it resides more specifically in a system of this general character wherein field excitation of the generator (and the motor also, if desired) is in part at least created through regulated application of alternating current to rectifiers the outputs of which are applied in turn to field windings. In its preferred form regulation of the alternating currents utilized is accomplished through alterations in magnetic flux paths rather than through alterations in electrical circuit connections and in this way motor control is accomplished entirely without resort to electrical switching. In a further extension of the principle of this invention speed regulation of a motor independently of regulation of a generator is also contemplated.

In the well known variable voltage motor control of the type usually designated "Ward Leonard," a generator having field windings which may be variably excited is employed. By arranging for reversal of excitation as well as its modulation and by employing a motor with a separately excited field, reversal of the motor as well as regulation of its output may be accomplished by control of the generator alone. In cases where the motor is subjected to highly variable and unpredictable loads, such for example as occur in the driving of certain elements of excavating machines, self protecting characteristics must be incorporated in the generator. In meeting this requirement a somewhat elaborate generator field system must be resorted to thus necessitating a complex switching arrangement for bringing about the several control functions desired. In equipment of large capacity the field currents to be controlled may be of such magnitude as to require an undesirably large amount of expensive switching equipment. The seriousness of the difficulty has led at times to the employment of a multiplicity of separate exciting generators whose smaller field currents may in turn be regulated by switching arrangements of more moderate size and expense. Another attempt to cope with the problem resorts to a specially designed generator capable of operating with exceptionally low field currents so that the switching problem is simplified. In all of these, the need for switching is not eliminated but is merely rendered less exacting so that available equipment may more nearly cope with the requirements.

In accordance with the present invention a system of variable voltage motor control is provided which may dispense entirely with circuit switching means. This is accomplished by supplying the necessary excitation currents for the generator field windings through rectifiers which are supplied in turn with alternating current which may be inductively or reactively regulated to the intensity desired, or in the case of independent motor control by regulation of the motor circuits alone in this fashion. Inductive or reactive regulation of the alternating current supply is accomplished without the opening, closing or altering of any circuit connection and in this way all need for switching is eliminated.

If for any reason it is desired to produce regulation of the alternating current supply by switching rather than inductively or reactively, the same may be resorted to as a limited application of this invention. In this case certain advantages other than the advantage of switchless regulation are nevertheless preserved in certain cases.

Among the advantages in addition to switchless regulation which the system of this invention exhibits, where a generator-motor system is controlled, is the advantage that the predominant generator field windings are of a unidirectional character giving to the operator positive control of generator polarity. All systems heretofore in use depend upon predominant field windings whose polarity must be reversed in order to cause reversal of the motor under control. Since a differential series field and a self excited cumulative shunt winding in addition to a separately excited field are essential parts of such systems a very annoying and possibly dangerous property is exhibited when an effort is made to plug suddenly while the motor is operating at high speed. Due to back voltage of the motor armature under such a condition the series winding becomes cumulative rather than differential in its effect adding to the effect of the self excited shunt field with the result that the separately excited field is not able to dominate and reverse the polarity of the generator. As a result the motor continues to drift for a prolonged interval at the very time the most abrupt stoppage possible is being demanded by the operator. Because of this possibility the tendency has been to limit the strength of the self excited shunt field and to strengthen the separately excited field so that its predominance will be insured under all conditions. When this inclination is followed to the point where the difficulty in question is overcome, rapid acceleration of the motor is sacrificed. An effort is, therefore, usually made to strike a compromise with the result that both disadvantages are usually present to a considerable degree, that is, some tendency to refuse to plug immediately at high speed still persists and acceleration is deficient. With the positive control of unidirectional field windings employed with the present invention no compromise is necessary. Plugging with substantial reverse torque and without undue delay, and rapid acceleration can both be made available in one and the same machine.

A further advantage of this invention is its inherent rapid but smooth modulation of control and load transitions. This advantage is possessed by reason of the permanent connection of certain field windings to unidirectionally conducting circuit elements of the rectifiers. By reason of this the field windings exhibit high self inductance on certain occasions and low self inductance on other occasions in a manner beneficial to the performance of the apparatus as a whole.

This invention is herein described by reference to the accompanying drawings forming a part hereof and in which there is set forth by way of illustration and not of limitation certain forms in which this invention may be embodied.

In the drawings:

Fig. 2 is a diagram of a fragment of a circuit showing a different type of motor field arrangement, which may be substituted for the motor field arrangement of Fig. 1;

Fig. 3 is a diagram of a circuit arrangement by which speed control of an alternating current motor may be obtained in accordance with this invention.

Figure 1:
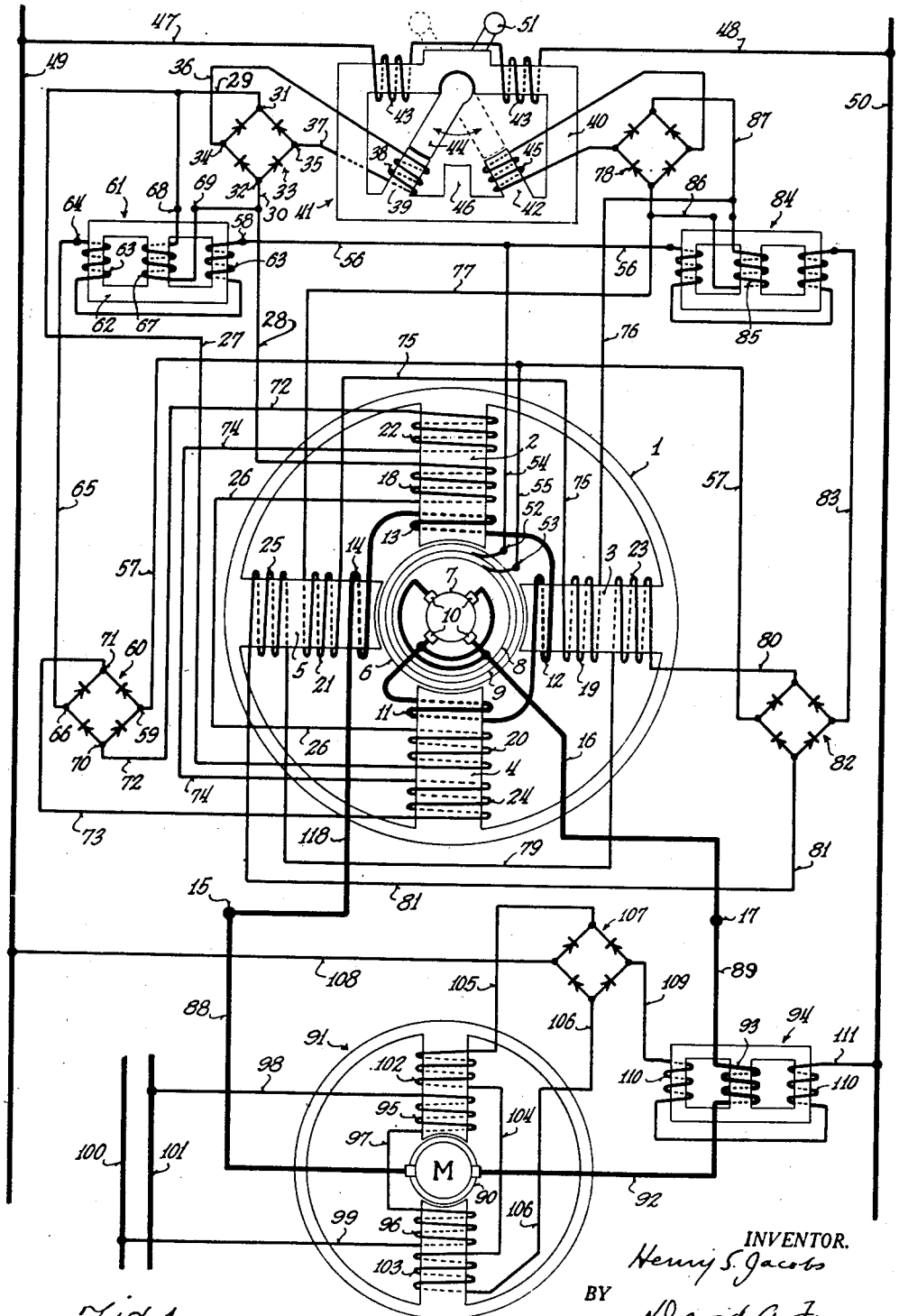
Fig. 1 is a diagram showing one form of the electrical circuit of this invention.

Referring to Fig. 1 of the drawings a generator field frame 1 having pole pieces 2, 3, 4 and 5, surrounding an armature 6 is diagrammatically depicted. The armature 6 is mounted to be driven in customary manner by means not shown and is wound in conventional fashion and connected to a commutator 7. In addition to the commutator 7 armature 6 carries a pair of slip rings 8 and 9, the same also being connected to the armature winding in known manner so as to receive alternating current therefrom. A set of brushes 10 mounted to engage commutator 7 is connected on the one hand through differential series field windings 11, 12, 13 and 14 and lead 118 with an output terminal 15, and on the other hand by a lead 16 with an output terminal 17. The differential series field windings 11, 12, 13 and 14 perform a useful adjunctive function in the particular form of the apparatus shown as will be more fully explained hereinafter. Such windings, however, are not essential to the main purposes to be accomplished and may be dispensed with or may be supplanted by other means productive of a similar regulating effect such as arrangements adapted to accentuate the effect of armature reaction as disclosed in my co-pending application Serial No. 561,098 filed October 30, 1944, now Patent Number 2,475,175, patented July 5, 1949, for Power Transmissions.

In the particular form of the apparatus shown it is intended that only two pole pieces be directly excited at one time, the other pole pieces being left to be indirectly excited by magnetic induction as consequent poles. In the case of pole pieces 2 and 4 the same are arranged to be simultaneously excited directly by externally supplied windings 18 and 20 and by internally supplied windings 22 and 24. Windings 18 and 20 are joined by a lead 26 and the outer ends of the two windings thus joined are connected by leads 27 and 28 with leads 29 and 30 joined respectively with the output terminals 31 and 32 of a full wave rectifier 33. Rectifier 33 is provided with input terminals 34 and 35 the same being joined respectively by leads 36 and 37 with the ends of a secondary winding 38 which surrounds a stationary secondary leg 39 of an induction regulator designated generally by the numeral 41.

Induction regulator 41 is made up of a rectangular frame 40, bearing a divided primary winding 43, a movable flux deflecting regulating arm 44, the secondary leg 38 previously mentioned, a similar stationary secondary leg 42 bearing a secondary winding 45, and an intermediate stationary by-pass leg 46. The ends of the primary winding 43 are connected by leads 47 and 48 with alternating current supply leads 49 and 50. The movable regulating arm 44 is pivotally mounted by means not shown and provided with a regulating handle 51 by which it may be moved to and held in any position desired between the position in which it is shown and its opposite position indicated by dotted lines.

When the regulating arm 44 is in the position shown, the transformer action between the primary winding 43 and the secondary winding 38 is such that alternating current is supplied by the winding 38 to the rectifier 33 at maximum potential. As the regulator 44 is moved toward the by-pass leg 46, the potential of the alternating current supplied by winding 38 to the rectifier 33 is gradually diminished to substantially zero. Further movement of the regulator 44 toward the leg 42 causes an increasing potential to be established in winding 45.

Alternating current supplied to the rectifier 33, results in the establishment of a direct current potential at rectifier terminals 31 and 32 and as a consequence exciting current is caused to flow unidirectionally in the externally excited field windings 18 and 20. The flux thus established in the generator field and armature structure (assuming armature 6 to be turning) results in the generation of electrical potential in the windings of armature 6. This potential appearing as an alternating potential at the slip rings 8 and 9 is picked up by brushes 52 and 53 and by them applied to leads 54 and 55.

Leads 54 and 55 are joined as shown with leads 56 and 57 which extends toward the left to connect respectively with terminal 58 of a reactor bridge 61 and input terminal 59 of a full wave rectifier 60. Reactor bridge 61 is made up of a three legged magnetic frame 62 having sections of a divided impedance winding 63 surrounding its two outer legs. One end of the winding 63 joins with the terminal 58 while the other end is joined to a lead 65 by a terminal 64. Lead 65 is connected in turn to the other input terminal 66 of the rectifier 60. The central leg of reactor 61 is surrounded by a saturation winding 67 which is joined by the terminals 68 and 69 with leads 29 and 30 for a purpose to be presently described.

Rectifier 60 is provided with output terminals 70 and 71 the former being connected by lead 72 with one end of self excited field winding 22 and the latter being connected by a lead 73 with one end of field winding 24. Windings 22 and 24 are joined by a lead 74 and thus caused to be simultaneously excited by current supplied by the rectifier 60.

Since the source of the rectified electrical energy supplied to the winds 22 and 24 is derived from the alternating current output of the armature 6 the intensity of the same will be proportional to the direct current voltage also supplied by the armature 6. The intensity of this excitation is furthermore dependent upon the impedance offered by the saturation controlled reactor 61. The impedance of the winding 63 of reactor 61 is subject to being varied and controlled by the degree of saturation of the magnetic frame 62 and this is subject to alteration through variations in the magnitude of the current flowing in a saturation winding 67. When induction regulator 41 is adjusted to cause the output of rectifier 33 to be at a maximum so also will the degree of saturation of frame 62 of the reactor 61 be at a maximum, and as a consequence a minimum of impedance to current flow will be offered by the winding 63 under that condition. The degree of excitation of windings 22 and 24 is therefore a function of both the voltage of armature 6 and the position of regulator 41.

Reactor 61 is preferably proportioned and wound to provide a maximum impedance sufficient to nearly stifle the excitation of windings 22 and 24 whenever the regulator 41 is in mid position. In this way a positively controlled self excited winding is provided in which termination of excitation is not dependent upon conditions prevailing within the generator. Windings 18 and 20 and windings 22 and 24 are arranged in the apparatus as shown to act accumulatively, for the purpose of producing a suitable build up of motor accelerating voltage.

In order to produce reverse flux in the field of the generator for the purpose of reversing the current output thereof, pole pieces 3 and 5 are arranged to be directly excited in such a direction as to reverse the flux through armature 6 and to cause pole pieces 2 and 4 to be rendered consequent poles by reason of induced magnetism. For this purpose pole pieces 3 and 5 are provided with externally excited windings 19 and 21, joined by a lead 75 and connected at their outer ends by leads 76 and 77 with the output terminals of a rectifier 78 which in turn is arranged to be supplied by winding 45 of induction regulator 41. Pole pieces 3 and 5 are further provided with internally excited windings 23 and 25 which are joined by a lead 79 and connected at their outer ends by leads 80 and 81 with the output terminals of a rectifier 82. Rectifier 82 is connected by lead 83 and saturation reactor 84 with lead 56 on the one hand and is directly joined with lead 57 on the other hand and in this way is arranged to be supplied with alternating current from the armature 6. The saturation winding 85 of reactor 84 is connected by leads 86 and 87 with the output of rectifier 78.

It will be observed that pole pieces 3 and 5 are thus subject to excitation and control in exactly the same manner as pole pieces 2 and 4 but alternatively with the same and in such direction as to reverse the flux through the armature 6. The output of the generator thus can be regulated by manipulation of handle 51 so as to alter the magnitude or the polarity thereof at will and entirely without the opening or closing of any switch. This action is herein referred to as "switchless" regulation.

The current supplied at the generator terminals 15 and 17 is caused to flow through permanently connected main lead 88, armature 90 of motor 91, lead 92, winding 93 of saturation reactor 94 and back to terminal 17 through main lead 89. Motor 91 may be provided with a separately excited field winding 95, 96 joined by a lead 97 and connected at its outer end by leads 98 and 99 with direct current power lines 100 and 101. Motor 91 may also be provided with a differential field winding 102, 103 joined by a lead 104 and connected at its outer end by leads 105 and 106 with the output terminals of a rectifier 107. One input terminal of rectifier 107 is connected by a lead 108 with alternating current power supply line 49. The other input terminal of rectifier 107 is connected by a lead 109, impedance winding 110 of reactor 94 and lead 111 with the other alternating current supply line 50.

Since the direction of field excitation of motor 91 is independent of the direction of motor armature current and remains unchanged, reversal of motor 91 can be caused simply by reversal of generator output which is under control of handle 51. While the direction of motor field excitation is independent of armature current the intensity thereof is not. As motor armature current increases so also does the strength of the bucking windings 102 and 103 by reason of the greater saturation and therefore smaller impedance prevailing in reactor 94. Thus, the net field flux of motor 91 may be caused to behave much in the manner of a differential series separately excited shunt motor but with the unique advantage of full reversibility by simple reversal of armature current. As a result a more adaptable power transmission having greater aptitude of self adjustment to rapidly varying load conditions is provided.

In certain cases it may be advantageous to employ a motor somewhat different from the motor 91. For example, in Fig. 2 is shown a motor 91' having a different field arrangement which may be substituted for the motor 91 shown in Fig. 1. In this case, a single field winding composed of coils 102' and 103' is arranged to be supplied by a rectifier 107' which in turn is supplied with alternating current controlled by passage through the impedance winding 110' of a saturation reactor 94'. As in the case of the motor 91 shown in Fig. 1, the main armature current is caused to pass through a saturation winding 93'.

The winding 110' of the saturation reactor 94' is so proportioned that with no direct current passing through winding 93' a small but substantial fraction of the rated field current of the motor 91' is permitted to pass. The magnitude of this fraction will depend upon the service to be performed, but in certain specific instances I prefer an arrangement which will supply from 20 to 30 per cent of the maximum field current under the condition mentioned. As the main armature current increases through the winding 93' the current passing through the field windings 102 and 103 will increase accordingly, reaching a maximum when armature current is at a maximum.

In the arrangement shown in Fig. 2 as soon as the control is thrown into the full-on position, and before motor 91' actually begins to rotate, a maximum stalled motor current is permitted to flow in the armature circuit. Under these conditions the saturation coil 93' on the saturation reactor 94' receives its maximum excitation, thus permitting the maximum current to flow through the winding 110', the rectifier 107' and the motor field windings 102' and 103'. This produces a field condition closely parallel to that prevailing in a series or heavily compound wound motor. As motor 91' accelerates, the main armature current falls off and the saturation reactor 94' causes a diminution in the field current supplied to the windings 102' and 103'. Motor 91' is therefore caused to operate in a manner quite similar to a heavily compounded or series motor under this condition also. An additional advantage of the motor shown in Fig. 2 is that it is capable of very rapid deceleration during plugging, due to the fact that the motor field actually increases as motor speed falls off. The motor further has a higher ultimate speed and is capable under conditions prevailing in excavator operation of performing close to the peak of its power curve during a larger part of its duty.

The motor shown in Fig. 2, of course, has the same advantage as the motor shown in Fig. 1 in that it may be plugged and reversed by simple reversal of armature current.

While sudden shifting of controller handle 51 from full forward to full reverse with motors 91 or 91' running under light load and at high speed will positively plug and reverse the same, this action cannot occur with such abruptness as to give rise to undesirable mechanical and electrical shocks in the system. Smooth and moderate transitions are caused in the apparatus of this invention by certain inherent self induction actions. For example, if the handle 51 is suddenly shifted from the position shown, the collapsing field in pole pieces 2 and 4 is delayed momentarily by a substantially closed circuit condition between windings 20, 18 and rectifier 33 and similarly between windings 22, 24 and rectifier 59. This follows since the unidirectional conductivity of the rectifiers 33 and 59 is correctly orientated to produce the desired effect.

Further, upon the bringing of member 44 suddenly into registry with leg 42, immediate excitation of pole pieces 3 and 5 is momentarily delayed by impedance of windings 19, 21, 35, 23 and 25. In addition, the building of flux in pole pieces 2 and 4 as consequent poles sets up induced currents in windings 18, 20 and 22, 24 which find low resistance paths through their respective rectifier thus adding further to the self induction available to soften the effect of sudden excitation.

The identical actions in reverse take place upon sudden displacement of the handle 51 in the other direction.

While, as explained above, switchless regulation is of great advantage particularly in the case of larger apparatuses, substitution of switches for the regulator 41 and the reactors 61, 84 and 94 or any of them may be resorted to if desired. The positiveness of field control without need for sacrificing acceleration and other advantages would be retained even though "switchless" regulation were dispensed with.

In its preferred form, as now shown, rectifiers 33, 78, 59, 82 and 107 are of the well known dry disk type having as an active material either selenium oxide or copper oxide. This invention, however, is independent of the particular form of rectifier employed, since electron emission or ionized gas or vapor rectifiers or rectifiers of other types may be used either in full wave or the partial wave form.

This invention may also be applied to the control of alternating current motors. One manner of thus applying the invention is illustrated in Fig. 3 where a conventional three phase slip ring induction motor 187 having a stator 112 and a wound rotor 113 is shown. Power for operating the motor 187 is supplied through power mains 114, 115 and 116.

Terminal 117 of motor 111 is connected by a lead 118 with a connecting lead 119 which joins the ends of reactor windings 120 and 121 mounted respectively upon saturation reactors 122 and 123. The opposite ends of windings 120 and 121 are joined by leads 124 and 125 with mains 114 and 116 respectively. In this way two alternative admission paths for supplying current to the terminal 117 are provided making it possible to establish the equivalent of direct connection from main 114 or 116 with the terminal 117.

In similar fashion terminal 126 is connected by lead 127 with a connecting lead 128 joining the ends of reactor windings 129 and 130 mounted respectively upon saturation reactors 131 and 132. The opposite ends of windings 129 and 130 are joined respectively by leads 133 and 134 with mains 116 and 114 respectively. In this way alternative admission paths between mains 116 and 114 and the terminal 126 are provided.

Terminal 135 of motor 187 is connected by lead 136 to a connecting lead 137 joining the windings 138 and 139 on saturation reactors 140 and 141 respectively. The opposite ends of windings 138 and 139 are joined together by lead 142 which is in turn connected by lead 143 with power main 115. While two admission paths are thus provided for the terminal 135 of motor 187, the same are not alternative and are confined to a single connection with main 115 for purposes to be more fully described hereinafter.

Saturation reactors 123, 141 and 132 are arranged to be controlled by saturation coils 144, 145 and 146, the same being connected in series and joined at one end by means of lead 147 with one output terminal of a rectifier 148. Rectifier 148 is arranged to be supplied with alternating current by an induction regulator winding 149 joined thereto by leads 150 and 151.

The winding 149 forms a part of an induction regulator 152 having an input winding 153 joined by leads 154 and 155 with power mains 116 and 114. Induction regulator 152 also has another output winding 156 which is joined by leads 157 and 158 with the input terminals of a rectifier 159.

Saturation reactors 122, 140 and 131 are controlled by saturation windings 160, 161 and 162 which are connected in series and joined by lead 163 with one output terminal of rectifier 159. The return connection for the saturation windings of the saturation reactors is provided in a manner to be presently described.

In addition to the regulating means above described and associated in circuit with the primary or stator windings regulating elements in circuit with the secondary or rotor windings may also be employed as illustrated. Connected respectively with slip ring terminals 164, 165 and 166 are secondary resistors 167, 168 and 169 respectively. The resistors 167, 168 and 169 are joined at their outer ends by leads 170 and 171. In shunt relationship with resistors 167, 168 and 169 are impedance windings 172, 173 and 174 respectively, the same being mounted upon and as part of saturation reactors 175, 176 and 177.

Saturation reactors 175, 176 and 177 are provided with saturation windings 178, 179 and 180. Saturation windings 178, 179 and 180 are joined in series and connected at one end by means of lead 181 and leads 182 and 183 with the lower ends of windings 146 and 162 respectively. In this way windings 178, 179 and 180 provide a return connection for all of the other saturator windings devoted to the control of the primary circuit, this being accomplished by the return lead 184 which joins at one end with the winding 180 and at the opposite end with a cross connecting lead 185 which is connected as shown to output terminals of rectifiers 148 and 159. By reason of the unidirectional conductivity of the said rectifiers a single return lead 184 is sufficient for the purpose as will be more fully explained hereinafter.

In normal operation at the outset the flux diverting arm 186 of induction regulator 152 will be in mid or vertical position and neither of the windings 149 nor 156 will be excited. If the operator chooses to deflect the arm 186 to the position shown in the drawing winding 149 becomes excited and rectifier 148 becomes a source of direct current potential. When this occurs, saturation reactors 123, 141, 132, 175, 176 and 177 become saturated and their corresponding reactor coils are deprived of their normally high impedance. This permits power to be admitted from mains 114, 115 and 116 to terminals 117, 135 and 126 respectively. The motor 111 being thus supplied with power tends to accelerate. At the outset of this acceleration there is little impedance in the windings 172, 173 and 174 by reason of the more or less complete saturation o the magnetic material with which they are associated. Large secondary currents are thus permitted to flow to provide a large starting torque if desired and motor 111 accelerates and behaves in a manner comparable to that of a squirrel cage motor. If the arm 186 of the induction regulator 152 were thrown to the extreme opposite position, an entirely comparable situation would exist except that the motor 111 would be driven in the opposite direction. Complete reversability of motor 11 without resort to any switching is thus provided.

If regulation of the output of motor 111 is desired, the arm 186 is moved to an appropriate intermediate position between its mid position and the position shown. When this occurs, incomplete saturation of saturation reactors 123, 141, 132, 175, 176 and 177 is provided, and their corresponding reactor coils exhibit a corresponding impedance. This causes a limitation to be placed upon the voltage applied to the primary windings of motor 111 and furthermore at the outset of acceleration interposes an equivalent resistance in the secondary circuit somewhat less than the resistance of resistors 167, 168 and 169. As acceleration of motor 111 progresses, the frequency of secondary current diminishes and without any alteration of the position of arm 186 the effect of secondary resistance diminishes accordingly. This permits the starting of motor 111 with a moderate inrush of starting current and furthermore permits speed regulation of motor 111 steplessly over a wide range.

Saturation reactors 140 and 141, while not essential to the main objective to be accomplished, serve to maintain complete balance in the primary circuit of motor 111 throughout the range of regulation of power input. They play no part, however, in the reversibility function which is performed entirely by saturation reactors 122 and 131 on the one hand and 123 and 132 on the opposite hand. It is also possible to dispense with the regulating circuit elements in the secondary circuit and to employ, if desired, a squirrel cage rotor in place of the wound rotor 113. In such an arrangement complete reversibility is preserved and some measure of speed control might also be obtained depending upon the character of the load imposed upon the motor 111.

The secondary circuit of the apparatus shown in Fig. 3 may also be re-arranged to cooperate with other well known speed regulating arrangements, such as, cascading or concatenation arrangements either direct or differential or both. For example, if the resistors 167, 168 and 169 are replaced by or regarded as being the stator windings of a squirrel cage motor, the shaft of which is mechanically coupled with the shaft upon which rotor 113 is mounted, then a cascading system is established which calls for full speed operation when saturation reactors 175, 176 and 177 are excited and half speed operation when the same are not excited. With such an arrangement it may be desirable to control the excitation of saturation reactors 175, 176 and 177 independently or semi-independently of the control of saturation reactors 144, 145, 146 and 160, 161, 162. This can be easily accomplished by providing an additional variably supplied rectifier for furnishing excitation current to the saturation reactors 175, 176 and 177. In like manner other variable speed motor arrangements such as the spinner type motor having an intermediate rotor may be steplessly regulated without resort to switches by application of the invention herein disclosed.

I claim:

1. In a dynamoelectric machine an armature and field frame including pole pieces forming a flux path; a first field winding therefor adapted to establish flux in said path in one direction; a second field winding therefor adapted to establish flux in said path in the opposite direction; an induction regulator having a primary winding adapted to be connected to a source of alternating current, a first and a second secondary winding and means for controllably and selectively varying the magnetic coupling between said primary winding and said secondary windings alternatively and to the mutual exclusion of one another; a first rectifier connected to be supplied with alternating current delivered by said first secondary winding; means forming a circuit connection between said first rectifier and said first field winding for applying the unidirectional output of said rectifier to said field winding; a second rectifier connected to be supplied with alternating current delivered by said second secondary winding; and means forming a circuit connection between said second rectifier and said second field winding for applying the unidirectional output of said rectifier to said field winding.

2. In a dynamoelectric machine an armature and a field frame including pole pieces forming a flux path; an externally excited field winding; means adapted to be connected to an external source of alternating current including a rectifier connected to said externally excited field winding for supplying unidirectional current thereto, means associated with said armature adapted to generate alternating current; a self excited field winding; a second rectifier means adapted to connect said armature alternating current output to said rectifier and through said rectifier with said self excited field winding, and a variable reactance interposed between said armature and said second rectifier adapted to control the current delivered thereto, and circuit means associated with said first rectifier and said variable reactance adapted to vary the impedance of the latter in response to the output potential of said first rectifier.

3. In a dynamoelectric machine an armature, a field frame, a first and second set of pole pieces adapted to be excited as directly excited poles and alternatively to be excited as consequently excited poles, forward windings adapted to excite said first set of poles directly and the remainder of said poles as consequent poles to establish a forward flux path, reverse windings for exciting the second set of said poles directly and the remainder of said poles as consequent poles to establish a reverse flux path, a source of alternating current, a first rectifier connected to be supplied by said alternating current source and connected to said forward windings to supply direct current thereto, a first inductively regulated means for varying the strength of alternating current supplied by said alternating current source to said rectifier, a second rectifier connected to be supplied by said alternating current source and connected to said reverse windings to supply direct current thereto, and a second inductively regulated means for varying the strength of alternating current supplied by said alternating current source to said second rectifier.

4. In an electrical apparatus adapted to transmit mechanical power reversibly the combination comprising a generator adapted to be driven by a unidirectional prime mover, a motor electrically connected to said generator to be driven thereby, separate forward and reverse field windings for said generator for reversing the polarity of the output thereof, means for energizing said generator field windings separately and alternatively, a saturation reactor having a saturation winding in circuit with said electrical connections joining said generator and said motor and an impedance winding, a rectifier in circuit with said impedance winding adapted to be supplied by alternating current passing therethrough, a separately excited field winding for said motor, and circuit connections joining said motor field winding with the direct current output of said rectifier.

5. In a dynamoelectric machine the combination comprising a field frame having pole pieces, an armature having windings, slip rings and brushes connected to said armature to receive alternating current therefrom, a saturation reactor having an impedance winding and a saturation winding, a first rectifier in circuit with said slip ring brushes and said impedance winding to be supplied with alternating current therefrom and passing therethrough, a second rectifier having its output in circuit with said saturation winding, means for supplying a controllable alternating current to the input of said second rectifier, a first field winding on said pole pieces, means forming a circuit connection between the output of said first named rectifier and said first named field winding, a second field winding on said pole pieces and means forming a circuit connection between the same and the output of said second named rectifier.

HENRY S. JACOBS.

REFERENCES CITED

The following references are of record in the file of this patent:

UNITED STATES PATENTS

| Number | Name | Date |
|---|---|---|
| 788,278 | Porter et al. | Apr. 25, 1905 |
| 1,426,123 | Stoekle | Aug. 15, 1922 |
| 1,493,851 | Ferris | May 13, 1924 |
| 1,503,213 | Stoekle | July 29, 1924 |
| 1,710,755 | West | Apr. 30, 1929 |
| 1,876,548 | Atherton | Sept. 13, 1932 |
| 1,955,322 | Brown | Apr. 17, 1934 |
| 2,079,466 | Phillips | May 4, 1937 |
| 2,102,911 | Perry | Dec. 21, 1937 |
| 2,121,588 | Eames | June 21, 1938 |
| 2,205,204 | King | June 18, 1940 |
| 2,228,078 | Guilliksen | Jan. 7, 1941 |
| 2,262,359 | Exner | Nov. 11, 1941 |
| 2,286,370 | Miller | June 16, 1942 |
| 2,287,835 | Satterlee | June 30, 1942 |
| 2,311,462 | Neal | Feb. 16, 1943 |
| 2,357,086 | Crever | Aug. 29, 1944 |
| 2,378,765 | Garr | June 19, 1945 |
| 2,399,872 | Krussman | May 7, 1946 |

FOREIGN PATENTS

| Number | Country | Date |
|---|---|---|
| 361,984 | Italy | Aug. 9, 1938 |